Figure 1:
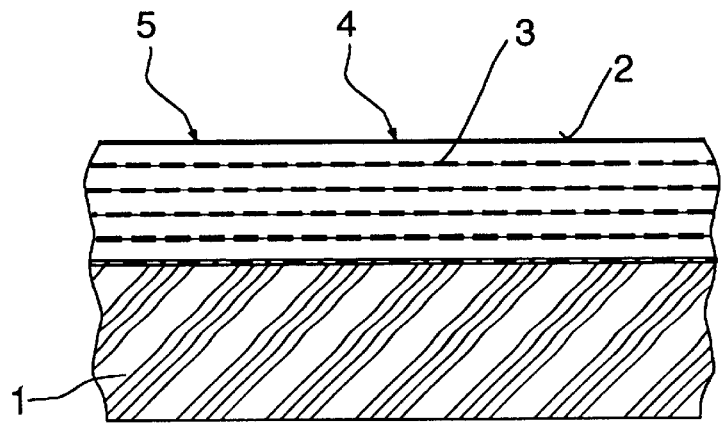

United States Patent [19]
Steininger et al.

[11] Patent Number: 6,033,516
[45] Date of Patent: Mar. 7, 2000

[54] PROCESS FOR THE PRODUCTION OF AN ANTICOPY FILM

[75] Inventors: Helmut Steininger, Worms; Peter Heilmann, Bad Duerkheim, both of Germany; Michael Willis, Histon, United Kingdom

[73] Assignee: Emtec Magnetics GmbH, Germany

[21] Appl. No.: 08/274,695

[22] Filed: Jul. 14, 1994

[51] Int. Cl.⁷ ..................................................... B32B 31/00
[52] U.S. Cl. ...................... 156/277; 156/204; 156/275.3; 156/269; 428/172
[58] Field of Search ..................................... 156/277, 290, 156/204, 269, 275.3, 275.5, 275.7; 428/158, 172, 159, 315

[56] References Cited

U.S. PATENT DOCUMENTS

| | | | |
|---|---|---|---|
| 3,914,485 | 10/1975 | Curtis | 428/71 |
| 3,931,429 | 1/1976 | Austin | 425/158 |
| 4,072,529 | 2/1978 | Hoornstra et al. | 96/115 R |
| 4,431,723 | 2/1984 | Proskow | 430/286 |
| 4,849,040 | 7/1989 | Wood | 156/204 |

*Primary Examiner*—Merrick Dixon
*Attorney, Agent, or Firm*—Keil & Weinkauf

[57] ABSTRACT

In the production of an anticopy film serving for covering documents against copying, opaque, strip-like coverings are applied by printing to the individual layers of a transparent, multilayer film in a mutually offset arrangement in such a way that the film appears opaque in the plan view, but transparent in an inclined viewing direction. To this end, a film web is printed with the coverings in sections corresponding to the layers, and the sections are subsequently folded over to give the layers.

12 Claims, 3 Drawing Sheets

PROCESS FOR THE PRODUCTION OF AN ANTICOPY FILM

The present invention relates to a process for the production of an anticopy film, in which opaque, strip-like coverings are applied by printing to both sides of the first layer of a transparent, multilayer film in a regularly repeating manner and offset to one another in a defined manner, and similar coverings are applied by printing to the underside of at least a second layer, offset to the first coverings in a defined manner.

Through the geometrical arrangement of the coverings on the layers, ie. through the offset of the coverings which overlaps in the arrangement as a whole, the anticopy film obtained in such a manner is intended to appear opaque for a viewing-angle range on the film (copying direction) and transparent in somewhat inclined viewing direction differing therefrom. This requires precise positioning both of the coverings on the individual layers and of the layers with respect to one another during production of the anticopy film. If the layers are produced individually and subsequently assembled to form the anticopy film, the requisite accuracy is virtually unachievable, or can only be achieved with considerable technical difficulty.

It is an object of the present invention to provide a process for the production of an anticopy film, in which the arrangement of the coverings on the film layers and their assembly to form the film can be carried out with the requisite accuracy in a technically simple manner.

We have found that this object is achieved by a process as defined at the outset, in which the coverings are applied to a film web in the arrangements offset in a defined manner in adjacent or successive sections conforming to the individual layers, the film web is then separated into the individual anticopy film formats, and the individual formats are folded along the section lines in the layers of the anticopy film, it also being possible for the separation and folding to be carried out in the reverse sequence.

Figure 2:
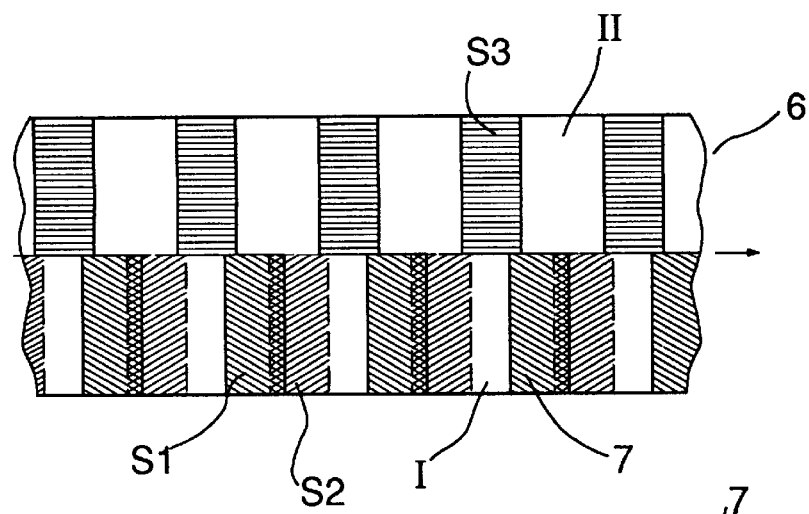
Figure 3:
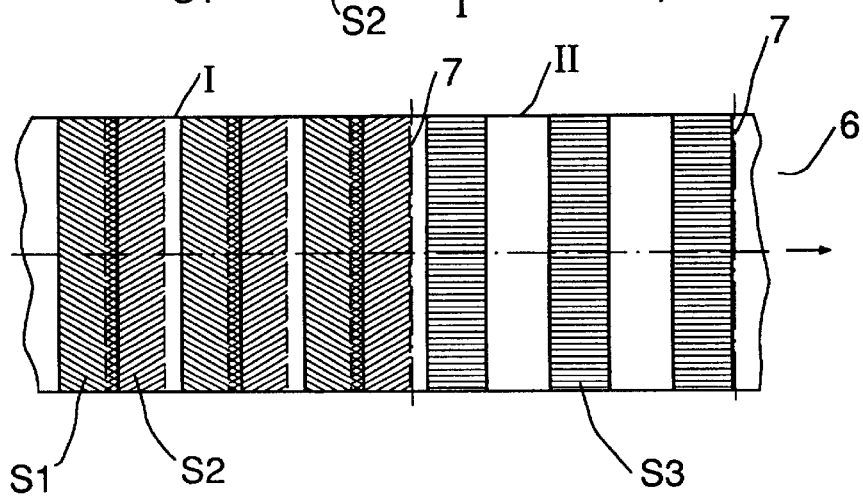
Figure 4:
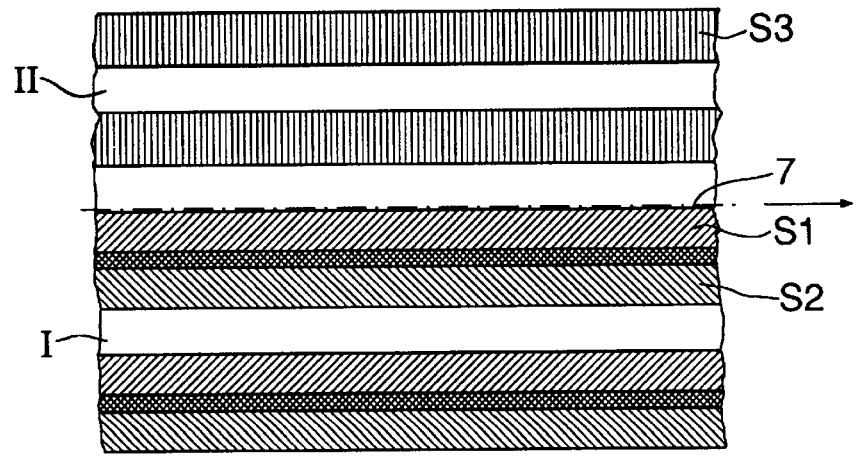
Figure 5:
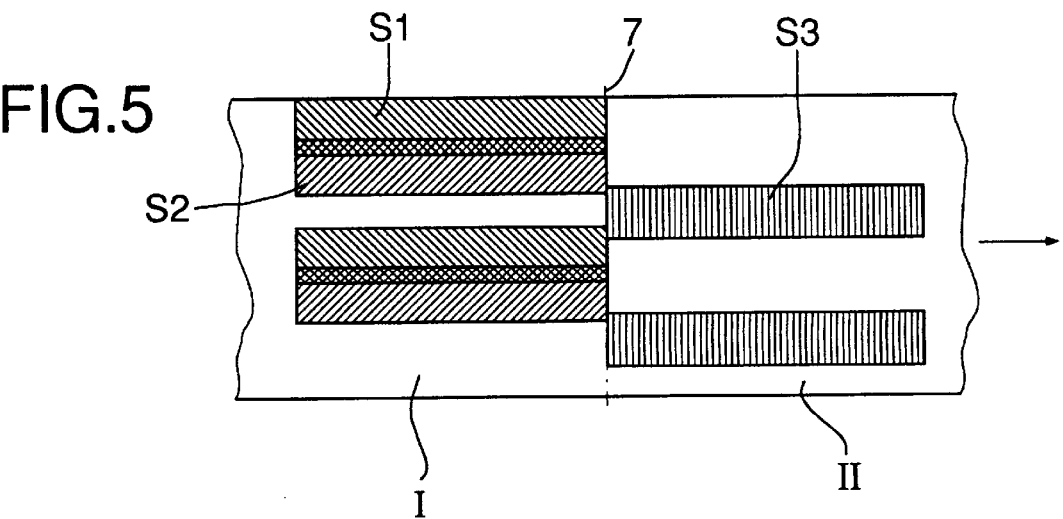

The process of the invention is described in greater detail below with reference to the illustrative embodiments shown diagrammatically in the drawing, in which FIG. 1 shows a cross section through a multilayer anticopy film produced from a film web and applied to a document, FIG. 2 shows a plan view of a film web having strip-like coverings in adjacent sections, FIG. 3 shows a plan view of a film web having strip-like coverings in successive sections, and FIGS. 4 and 5 show a film web as in FIGS. 2 and 3, but having coverings extending along the film web.

Figure 6:
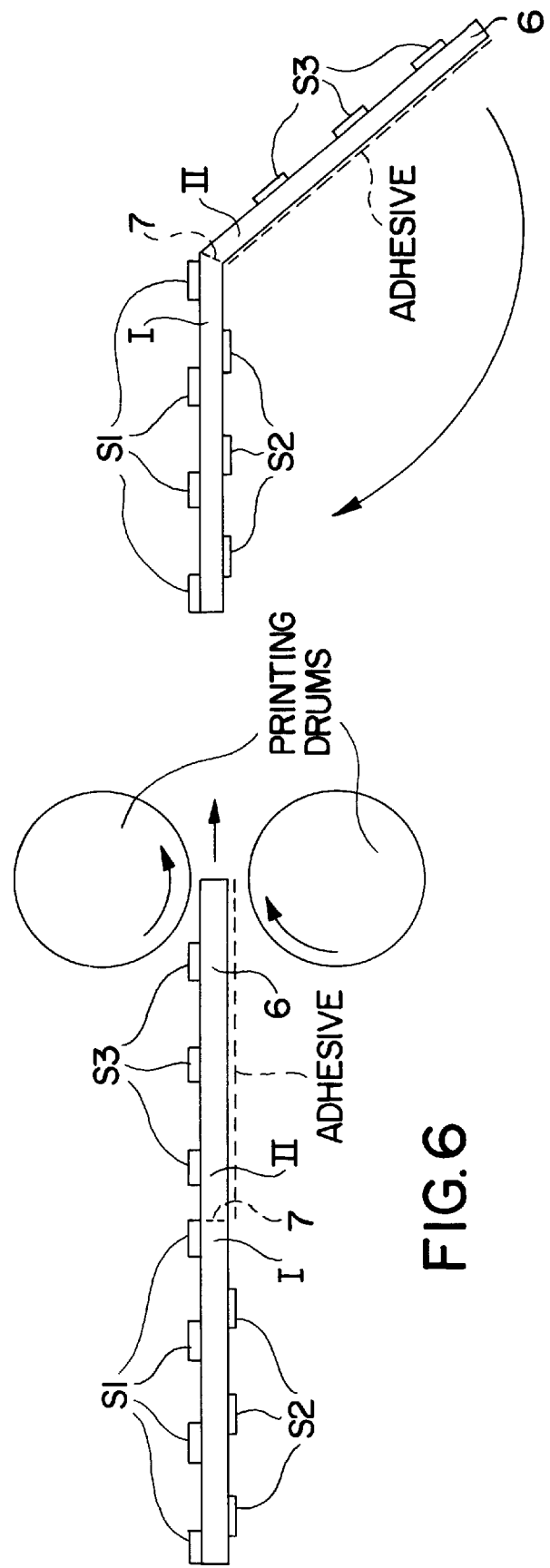

FIG. 6 shows the process of producing the film, including how section II is folded over onto section I.

The anticopy film to be produced by the novel process is shown in cross section in FIG. 1 and comprises a film 2 of transparent, multilayer material in the format of the document 1 to be covered, or parts thereof, having regularly repeating, opaque or reflective coverings printed.onto the individual layers. Radiation-curing printing inks which minimize geometrical changes during drying are advantageously used. The mutually offset arrangement of the coverings 3 means that the film, in a similar manner to an adjustable Venetian blind, appears opaque in the plan view 4, corresponding to the copying direction, but transparent in an inclined viewing direction 5.

The illustrative embodiments shown in FIGS. 2 and 3 show the production of a two-layer anticopy film, in which a transparent film web 6 is divided in the longitudinal direction (FIG. 2) or transversely to the web (FIG. 3) into two parallel sections I and II printed with the strip-like coverings S1, S2 and S3. If more than two layers are to be provided, as in FIG. 1, the film web should be divided into the corresponding number of sections.

The section I corresponding to the first layer is printed on both sides with the opaque or reflective, strip-like coverings SI and S2, and section II of the second layer is printed with the coverings S3 only on the side facing away from the first layer when the layers are subsequently laid one on top of the other.

The coverings S1, S2 and S3 are arranged in a regularly repeating manner such that the covering offset described at the outset and shown in FIG. 1 arises when the layers are subsequently laid one on top of the other. Further geometrical considerations of the arrangement of the coverings are described in German Patent Application P 42 26 906.

The coverings can be printed onto the film web using conventional printing methods, such as intaglio printing, offset printing, dry offset printing and wet/dry offset printing, etc. It has proven advantageous to apply all the coverings in a single passage of the film web with the aid of a precision simultaneous printing machine. This achieves accurate positioning of the coverings with respect to one another. It is furthermore advantageous in this respect if the coverings are printed in the direct spatial vicinity of one another.

After the coverings have been printed on, the film web 6 is separated into the individual anticopy film formats. Subsequent folding of the formats along the section lines 7 in the layers lying one on top of the other gives the ready-to-use anticopy film. Folding before separation may also be expedient.

It is expedient for sides coming into contact to be bonded to one another, for example by means of a lamination adhesive. Particularly suitable adhesive films, which produce the permanent bond between anticopy film and document when the anticopy film is used, are hot-melt adhesives, for example heat-sealable adhesives, or a permanent contact adhesive. In the latter case, a release film covering the contact adhesive, which should be removed before use, prevents undesired bonding. In order to reduce the reflection and also wear of the anticopy film, a protective layer of a thin, laminated film, an organic lacquer or a thin inorganic layer, if appropriate also a plasma-polymerized layer, can be applied to the sides of the film layers facing the observer, in which case the adhesive layer is on the side facing the document. In order to reduce reflection, it is also possible to use a film which has been rendered matte on one side.

In the illustrative embodiments described above, the strip-like coverings run transversely to the film web. The copying protection thereby achieved can also be retained if the coverings run parallel to the film web, as shown in FIGS. 4 and 5.

We claim:

1. A process for the production of an anticopy film, in which opaque, strip-like coverings are applied by printing to both sides of the first layer of a transparent, multilayer film in a regularly repeating manner and offset to one another in a defined manner, and similar coverings are applied by printing to the underside of at least a second layer, offset to the first coverings in a defined manner, wherein the coverings are applied to a film web offset in the manner defined in adjacent or successive sections conforming to the individual layers, the film web is then separated into the individual anticopy film formats, and the individual formats are folded along the section lines in the layers of the anticopy film, it also being possible for the separation and folding to be carried out in the reverse sequence.

2. A process as claimed in claim 1, wherein the coverings are applied simultaneously to the film web in a print run offset in the manner defined.

3. A process as claimed in claim 1, wherein, before the layers of the film are folded onto one another, adhesive is applied to in each case at least one of the sides coming into contact, and a protective lacquer, which protects against mechanical or chemical degradation, or prevents light reflection, is applied to the other sides.

4. A process as claimed in any of claim 1, wherein the coverings are applied to a film which has been rendered matte and reduces light reflection on at least one side.

5. A process as claimed in claim 1, wherein radiation-curing printing inks which minimize geometrical changes during drying are used for the coverings.

6. A process as claimed in claim 2, wherein the coverings are applied to a film which has been rendered matte and reduces light reflection on at least one side.

7. A process as claimed in claim 3, wherein the coverings are applied to a film which has been rendered matte and reduces light reflection on at least one side.

8. A process as claimed in claim 2, wherein, before the layers of the film are folded onto one another, adhesive is applied to in each case at least one of the sides coming into contact with each other, and a protective lacquer, which protects against mechanical or chemical degradation or prevents light reflection, is applied to the other sides.

9. A process as claimed in claim 2, wherein radiation-curing printing inks which minimize geometrical changes during drying are used for the coverings.

10. A process as claimed in claim 3, wherein radiation-curing printing inks which minimize geometrical changes during drying are used for the coverings.

11. A process as claimed in claim 4, wherein radiation-curing printing inks which minimize geometrical changes during drying are used for the coverings.

12. Anticopy film produced in a process as claimed in claim 1, in which opaque, strip-like coverings are applied by printing to both sides of the first layer of a transparent, multilayer film in a regularly repeating manner and offset to one another in a defined manner, and similar coverings are applied by printing to the underside of at least a second layer, offset to the first coverings in a defined manner, wherein the coverings are applied to a film web in the arrangements offset in a defined manner in adjacent or successive sections conforming to the individual layers, and said adjacent or successive sections are separated by folding along longitudinal or transversal bonding lines respectively and the surfaces of said layers are connected together.

* * * * *